United States Patent [19]

Newton

[11] Patent Number: 4,823,547

[45] Date of Patent: Apr. 25, 1989

[54] THRUST REVERSER

[75] Inventor: Arnold C. Newton, Derby, England

[73] Assignee: Rolls-Royce plc, Derby, England

[21] Appl. No.: 89,340

[22] Filed: Aug. 25, 1987

[30] Foreign Application Priority Data

Oct. 30, 1986 [GB] United Kingdom .............. 8625930

[51] Int. Cl.[4] ............................................. F02K 3/04
[52] U.S. Cl. .................................... 60/226.2; 60/230;
239/265.31
[58] Field of Search .................. 60/226.2, 229.230;
239/265.31, 265.29, 265.27, 265.37, 265.33;
98/121.2; 49/74, 75

[56] References Cited

U.S. PATENT DOCUMENTS

| | | | |
|---|---|---|---|
| 2,209,384 | 7/1940 | Brown | 98/121.2 |
| 3,346,007 | 10/1967 | Agnon | 98/121.2 |
| 3,739,582 | 6/1973 | Maison | 60/230 |
| 3,981,451 | 9/1976 | Prior et al. | 239/265.31 |
| 4,026,105 | 5/1977 | James | 239/265.31 |
| 4,030,290 | 6/1977 | Stachowiak | 239/265.27 |
| 4,030,291 | 6/1977 | Sargisson | 239/265.31 |
| 4,760,960 | 8/1988 | Ward et al. | 60/230 |

FOREIGN PATENT DOCUMENTS

| | | | |
|---|---|---|---|
| 29275 | 9/1931 | Australia | 98/121.2 |
| 635013 | 3/1928 | France | 49/75 |
| 1259045 | 1/1972 | United Kingdom | 239/265.29 |

*Primary Examiner*—Donald E. Stout
*Attorney, Agent, or Firm*—Cushman, Darby & Cushman

[57] ABSTRACT

Gas turbine engines, usually of the kind which include ducted fans, have cowl structures which generate drag inter alia by virtue of their frontal area. Where the cowl is of very large diameter i.e. in the order of 3 to 4 meters, if known devices such as thrust reverser cascades are installed in them, the frontal area and weight of the structure would be unacceptable. The invention provides a cowl structure of the magnitude mentioned hereinbefore, in which an improved cascade is installed. The or each cascade comprises a pair of rectangular frames which are joined by vanes. The vanes are pivotably connected to the frames in the manner of parallel rules as used in navigation. When non operative, the frames are stowed in superimposed relationship and thus enable a thinner cowl to be utilized than is possible in known cascade storage arrangements.

12 Claims, 2 Drawing Sheets

THRUST REVERSER

The present invention relates to thrust reversers for use in gas turbine engines which are utilised for the propulsion of aircraft, and includes gas turbine, ducted fan engines.

It is common practice to provide gas turbine and gas turbine ducted fan engines with thrust reverser devices. These take the form of annular or rectangular frames which support shaped vanes within their boundaries. The frames are enclosed within the outer cowl of the engine and when needed, are uncovered by moving the appropriate part of the cowl structure, so as to enable propulsive fluid to be diverted from the duct which is defined in part by the cowl, into the frame of vanes. The vanes are so shaped and positioned as to impart a reverse component in the direction of fluid flow relative to its direction of flow prior to being diverted.

The frame and vane structures are known as cascades and will be referred to as such hereinafter.

Commonly, the cascades are of fixed geometry and as such, dictate the cross sectional area of the cowl structure which contains them. This in turn influences the length of the cowl when airflow characteristics over its outer surface are considered ie a thick cowl needs considerable length to avoid rapid change in section thickness which would otherwise provide break away of the airflow with consequent drag. Further, a thick cowl presents a large frontal area which is another source of drag, and of course, excessive weight.

The present invention seeks to provide inter alia a gas turbine engine which includes an improved cascade structure in an outer cowl thereof.

According to the present invention, a gas turbine engine includes a cowl, an annular portion of which is translatable relative to the remainder thereof, at least one cascade structure comprising a pair of rectangular frames which in a non operative position are superimposed one upon the other within said cowl, one of said frames being connected to a cowl portion, by an end the other of said frames being pivotably attached to the one frame via leading and trailing edges of a plurality of vanes, so as to enable relative, bodily arcuate movement thereof, to a position where the frames are spaced from each other and the vanes are in attitudes wherein, in operation, they deflect propulsive gases which enter between them.

In said non operative position, said cascade structure may rest within the translatable cowl portion and be exposed to propulsive gases on said translation occurring.

Preferably, the other of said frames is movable bodily in said arcuate manner by forces exerted by the propulsion gases on the vanes.

The translatable cowl portion may comprise the downstream portion of the cowl.

Alternatively, the translatable cowl portion may comprise an intermediate portion of the cowl.

The cascade structure when inoperative may rest in a fixed cowl position upstream of the translating portion and be translatable with the translatable portion to an operative position.

Preferably, blocker doors are provided and are movable to a position wherein on exposure of the cascades, said blocker doors block the gas turbine engine flow duct through which said propulsive gases flow, at a position downstream of the exposed cascades and so cause a substantial flow of propulsive gases into the cascade structure.

The blocker doors when inoperative may comprise a portion of the inner wall of the cowl.

The invention will now be described, by way of example and with reference to the accompanying drawings in which.

Figure 1:
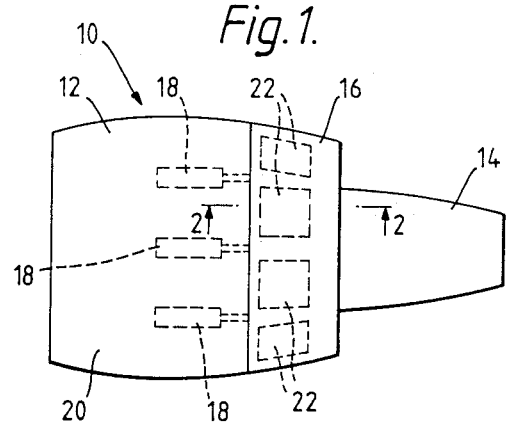
FIG. 1 is a diagrammatic view of a gas turbine ducted fan engine incorporating an embodiment of the present invention.

In FIG. 1 a gas turbine, ducted fan engine 10 includes a cowl 12 which with a core gas generator 14, defines a fan duct in known manner. The downstream portion 16 of the fan cowl 12 is translatable relative to the remainder of the cowl 12, again in known manner.

Translation of the cowl portion 16 is bought about by operation of rams 18 which are fixed within the fixed, upstream cowl portion 20.

A number of thrust reverser cascades 22 are affixed to the fixed portion 20 of the cowl 12 and, when non operative, rest within the translatable cowl portion 16.

Figure 2:
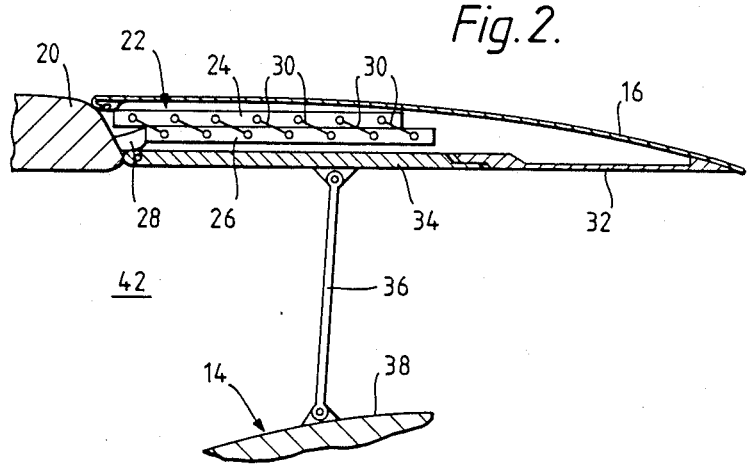
FIG. 2 is a view of line 2—2 of FIG. 1.

Referring now to FIG. 2. Each cascade structure 22 has upper and lower rectangular frames numbered 24 and 26 respectively. The lower frame 26 is rigidly fixed to the downstream end of the fixed cowl portion 20 via an annular beam 28. This is more clearly seen in FIG. 3.

The upper frame 24 is connected via the vanes 30 to the lower frame 26. Each vane 30 is pivotably connected at its ends to the frames 24 and 26, so that the upper frame 24 can be moved bodily in an arcuate path, about a radius of arc which is defined by the distance between the pivot axes of each vane 30.

The translatable cowl portion 16 includes within its inner wall 32, a number of equi-angularly spaced, trapezoidal blocker doors 34, each of which is connected by a respective link 36 to the casing 38 of the core gas generator 14, in known manner. Each blocker door 30 is pivotably connected via its upstream end 40 to the inner wall of cowl portion 16 and on the cowl portion 16 being translated so as to expose the cascades 22, blocker doors 34 are pivoted across the duct 42 to a position wherein they combine to block most or all of the duct 42, at a position downstream of the cascades 22. This is partially shown in FIG. 3, to which reference is now made.

Figure 3:
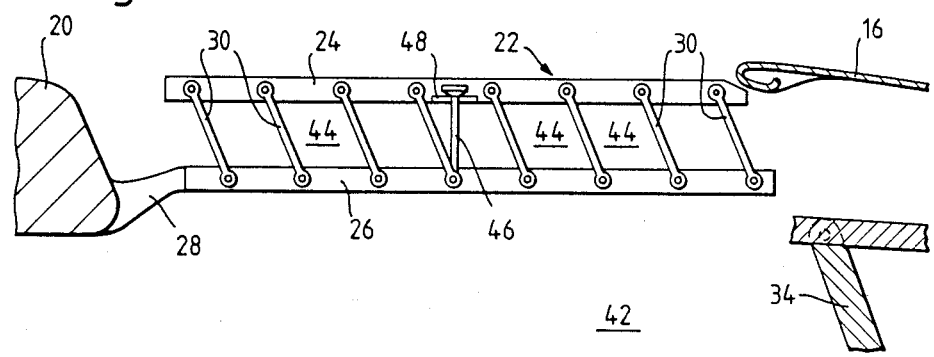
FIG. 3 is an enlarged view of FIG. 2.

In FIG. 3, the cowl portion 16 has been translated so as to expose the cascades 22. The blocker doors 34 have been caused to pivot across the duct 42, to block it with the result that the propulsive gases (in the present example, air) are diverted onto the vanes 30 of the cascades 22. The force exerted by the airflow pivots the vanes about their connections with the lower frame 26, so that the upper frame 24 is lifted to the position shown. Passageways 44 to atmosphere are thus defined for a flow through of the propulsive gases.

In order to achieve a flow in a direction opposite to that in the duct 42, it is important to prevent the vanes 30 from being blown into attitudes which are truly radial to the axis of the duct 42. To this end, links 46 are provided which are also pivotably connected to the lower frame 26, but which hook onto local lands 48 on the side of the cooperating upper frames 24. Links 46 are shorter than the vanes 22 and when they reach a true radial position with respect to the axis of the duct 42, the links 42 jam on the lands 48 and prevent the frames 24 and 26 from separating further. The vanes 22 are thus held at an angle which has a component of direction which achieves at least to some extent the said reversal of flow. Only one link 42 is shown, but any suitable number may be used.

When it is desired to obviate reverse thrust, the cowl portion 16 is caused to move to cover the cascade 22 and in so doing, the leading edge of the cowl portion 16 engages the adjacent edge of the cascade 22 and exerts a force thereon which results in the vanes pivoting to their nearly horizontal position as shown in FIG. 2. Initially the propulsive gas flow will greatly resist such movements but as the cowl portion 16 moves, so the blocker doors 36 are lifted, with the result that the blockage is reduced at an increasing rate. The load in the vanes reduces at a rate commensurate with the blockage reduction.

The man skilled in the art, having read the description, will realise that the frames 24, 26 could be caused to move forwards and away from each other by mechanical means (not shown). For example, each cascade 22 could have its own ram. Such a device may obviate the need for the links 46 in so far as the means for actuating the rams could be utilised to hold them in the operative position and thus the cascades 22. Alternatively, a reduced number of rams, or screw jacks, none of which are shown, could be connected to a thrust ring (not shown) which in turn would be connected to each cascade for the purpose of transferring ram forces thereto.

Figure 4:
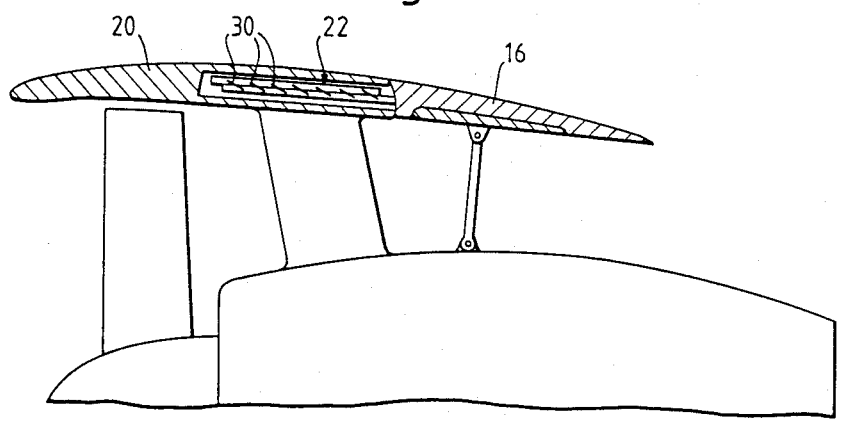
FIG. 4 depicts a second embodiment of the present invention.

Referring now to FIG. 4 in which like or corresponding parts are given like numerals. Thus the translatable cowl portion 16 and the lower frame 26 of the cascades 22 are rigidly connected and each cascade 22 nests within the fixed, upstream cowl portion 20 when not operative. On translation of cowl portion 16 in a downstream direction, the cascades 22 are withdrawn from the cowl portion 20. The frames 24 and 26 could not be separated by propulsive gases however, until the entire cascade 22 is exposed. Further, it would require other means to pivot the vanes 30 to their non operative positions prior to returning the cowl portion 16 to its non operative position, so as to avoid the frame 24 fouling the cowl portion 20. To this end eg further rams (not shown) extend on translation of the cowl portion 16. Prior to retraction of the cowl portion 16, the rams (not shown) would be actuated to pivot the vanes 30 to their non operative attitudes and then will retract with the cowl portion 16 and its associated rams 18 (FIG. 1).

Figure 5:
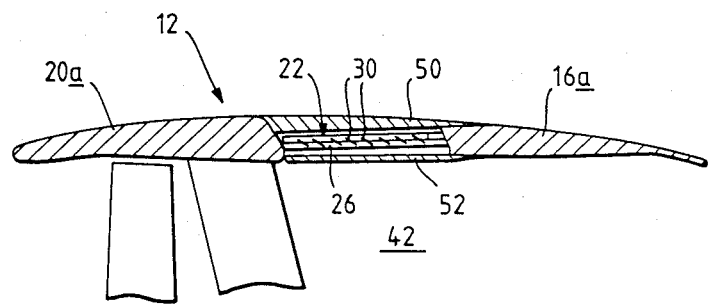
FIG. 5 depicts a third embodiment of the present invention.

Referring to FIG. 5 wherein again, like parts have like numerals.

The cowl 12 has an upstream portion 20a and a downstream portion 16a which are axially spaced. The space is bridged by the lower frames 26 of the cascades 22 which are rigidly fixed to both the upstream and downstream cowl portions 20a and 16a.

Intermediate cowl portion 50 surrounds the cascades 22 externally and provides a cowl outer flow surface. A further intermediate cowl portion 52 lies inside the cascades 22 and provides a flow surface in the fan duct 42.

The cowl portions 50 and 52 are inter-connected in known manner for simultaneous translation axially of the remainder of the cowl 12, so as to uncover the cascades 22. Although not shown, blocker doors of the kind illustrates in FIGS. 2 to 4 inclusive, may be included in the inner portion 52 and be arranged to move across the duct 42 in the same manner thereas.

The vanes 30 may be returned to their inoperative positions in the same manner as described in connection with FIG. 3.

In all of the examples shown, no means have been described or illustrated by which the translating cowl portions are supported for translation. In each case however, axially extending beams would be utilised, which are fixed to the fixed cowl portions in a manner well known in the art.

Depending on just where on the engine periphery it is designed to eject the propulsive flow, one or more cascade structures 22 may be employed and positioned accordingly. Other positions in the same plane may be blanked off, (not shown) so as to avoid directing propulsive gases onto eg associated aircraft structure.

Figure 6:
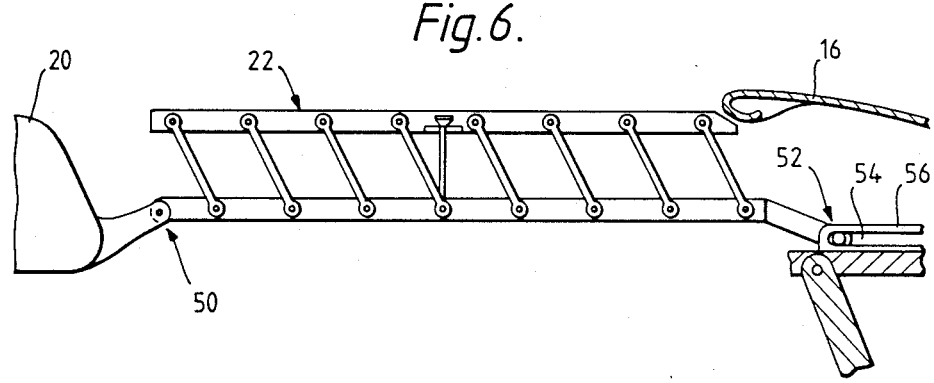
FIG. 6 depicts a fourth embodiment of the present invention.

Referring now to FIG. 6. In this further embodiment of the present invention, each cascade structure 22 is hingedly connected to the fixed upstream cowl portion 20 as is indicated by the numeral 50. The cascade structure 22 is also connected via a slot and pin mechanism 52, to the interior of the translatable cowl portion 16.

The slot 54 is in a rib 56 which extends within the cowl portion 16, a distance such as to enable the cowl portion 16 to fully close up to the fixed cowl portion 20. Incorporation of this last described arrangement enables pivoting of the cascade 22 so as to avoid it jamming within the cowl portion 16 when the latter translates, in a situation wherein the interior of the cowl portion 16 is not aligned with the cascade 22.

I claim:

1. A gas turbine engine including a cowl, an annular portion of which is translatable relative to the remainder thereof, at least one cascade structure comprising a pair of rectangular frames which, in a non-operative position are superimposed, one upon the other within said cowl, a plurality of vanes each having a leading and a trailing edge with said leading edges being pivotally connected to one of said frames and said trailing edges being pivotally connected to the other of said frames, one of said frames being connected to said cowl, the other of said frames being pivotally attached through the trailing edges of said plurality of vanes, to said one frame so as to enable relative, bodily arcuate movement thereof from said non-operative position wherein substantially no propulsive gases can pass between said vanes to a position wherein the frames are spaced from each other and the vanes are in an attitude wherein, in operation, they deflect propulsive gases which enter between them.

2. A gas turbine engine as claimed in claim 1 wherein in the non operative position, the cascade structure is nested within the translatable portion of the cowl and is exposed to propulsive gases on occurrence of said translation.

3. A gas turbine engines as claimed in claim 1 or claim 2 wherein the other of said frames is moveable bodily in said arcuate manner by forces exerted on the vanes by the propulsive gases.

4. A gas turbine engine as claimed in claim 1 wherein the translatable cowl portion comprises the downstream portion of the cowl.

5. A gas turbine engine as claimed in claim 1 wherein said one frame is connected via a pivot to a non translatable cowl portion and via a pin and slot arrangement within a translatable cowl portion.

6. A gas turbine engine as claimed in any one of claims 1, 2 or 3 wherein the translatable cowl portion comprises a portion intermediate the upstream and downstream ends of the cowl.

7. A gas turbine engine as claimed in claim 1 wherein the cascade structure when inoperative nests with a fixed cowl portion and is connected for translation with the translatable cowl portion into an operative position.

8. A gas turbine engine as claimed in claim 7 wherein the other of said frames is movable bodily in said arcuate manner by forces exerted on the vanes by the propulsive gases.

9. A gas turbine engine as claimed in claim 1 including blocker doors mounted for operation in a propulsive gas duct, the outer wall of which is defined by said cowl, said blocker doors being movable between a position wherein they block the duct and divert the propulsive gases to the cascade structure and a position wherein they provide part of the flow surface of said duct outer wall.

10. A gas turbine engine as claimed in claim 1 wherein the gas turbine engine includes a ducted fan, the outer wall of the fan duct being defined by said cowl.

11. The invention as claimed in claim 10, wherein said vanes are connected to said respective frames by linkage means permitting movement of said vanes from said non-operative position to said position where the frames are spaced from each other upon contact with said propulsive gases.

12. A cowl that is use surrounds a gas turbine engine and defines the outer wall of a propulsive gas flow duct thereby, including a translatable annular portion, at least one cascade structure which when non-operative nests within said cowl and comprising a pair of rectangular frames which, in a non-operative position are superimposed, one upon the other, a plurality of vanes each having a leading and a trailing edge with said leading edges being pivotally connected to one of said frames and said trailing edges being pivotally connected to the other of said frames, one of said frames being fixed to said cowl, the other of said frames being pivotally attached through the trailing edges to the plurality of vanes, so as to enable relative, bodily arcuate movement thereof from said non-operative position wherein substantially no propulsive gases can pass between said vanes to a position wherein the frames are spaced from each other and the vanes are in an attitude wherein in operation on a gas turbine engine, they deflect propulsive gases which enter between them.

* * * * *